United States Patent
Kamamoto et al.

(10) Patent No.: US 10,422,382 B2
(45) Date of Patent: Sep. 24, 2019

(54) BALL BEARING

(71) Applicant: JTEKT CORPORATION, Osaka-shi, Osaka (JP)

(72) Inventors: Shigeo Kamamoto, Kashiwara (JP); Junji Murata, Kashiba (JP); Yuki Shishihara, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/879,595

(22) Filed: Jan. 25, 2018

(65) Prior Publication Data

US 2018/0223906 A1 Aug. 9, 2018

(30) Foreign Application Priority Data

Feb. 6, 2017 (JP) .................. 2017-019428

(51) Int. Cl.
| | |
|---|---|
| *F16C 33/38* | (2006.01) |
| *F16C 33/41* | (2006.01) |
| *F16C 19/02* | (2006.01) |
| *F16C 19/06* | (2006.01) |
| *F16C 19/16* | (2006.01) |

(52) U.S. Cl.
CPC .......... *F16C 33/3887* (2013.01); *F16C 19/02* (2013.01); *F16C 33/412* (2013.01); *F16C 33/416* (2013.01); *F16C 33/418* (2013.01); *F16C 19/06* (2013.01); *F16C 19/163* (2013.01)

(58) Field of Classification Search
CPC .. F16C 33/38; F16C 33/3806; F16C 33/3837; F16C 33/3843; F16C 33/3856; F16C 33/412; F16C 33/414; F16C 33/416; F16C 33/418; F16C 33/467; F16C 33/3387
See application file for complete search history.

(56) References Cited

U.S. PATENT DOCUMENTS

| | | | | |
|---|---|---|---|---|
| 3,805,932 | A * | 4/1974 | Ernst ....................... | F16C 19/50 192/45.004 |
| 6,068,408 | A * | 5/2000 | Mutoh ................ | F16C 33/3887 384/470 |

FOREIGN PATENT DOCUMENTS

| | | | |
|---|---|---|---|
| JP | 2008164094 | * | 7/2008 |
| JP | 2014001748 | * | 1/2014 |
| JP | 2014-070669 A | | 4/2014 |

* cited by examiner

*Primary Examiner* — James Pilkington
(74) *Attorney, Agent, or Firm* — Oliff PLC (57) ABSTRACT

A cage of a ball bearing includes an annular portion located on a first axial side with respect to balls, the first axial side being one side in an axial direction of the ball bearing, and cage bars extending from the annular portion toward a second axial side, the second axial side being the other side in the axial direction of the ball bearing. A space located on a second axial side of the annular portion and defined between any two of the cage bars adjacent to each other in a circumferential direction serves as a pocket that accommodates a corresponding one of the balls. The pocket has a contact surface that is brought into point contact with the ball at an intersection point between a rotational center axis of the ball and a surface of the ball when the cage is displaced toward the second axial side.

9 Claims, 7 Drawing Sheets

BALL BEARING

INCORPORATION BY REFERENCE

The disclosure of Japanese Patent Application No. 2017-019428 filed on Feb. 6, 2017 including the specification, drawings and abstract, is incorporated herein by reference in its entirety.

BACKGROUND OF THE INVENTION

1. Field of the Invention

The invention relates to a ball bearing.

2. Description of the Related Art

A ball bearing is a low torque bearing (with low rotational resistance), and ball bearings with even lower torque are increasingly required in recent years. The ball bearing includes an inner ring, an outer ring, a plurality of balls and an annular cage. A rotational performance of the ball bearing is secured by grease (lubricant) provided in an annular space formed between the inner ring and the outer ring. The cage functions as a separator that separates the balls disposed between the inner ring and the outer ring. The cage is made of steel or resin. A steel cage has a pair of annular members. The balls are sandwiched between the annular members from both sides and the annular members are coupled using rivets, for example (see Japanese Patent Application Publication No. 2014-70669 (JP 2014-70669 A), for example).

Figure 7:
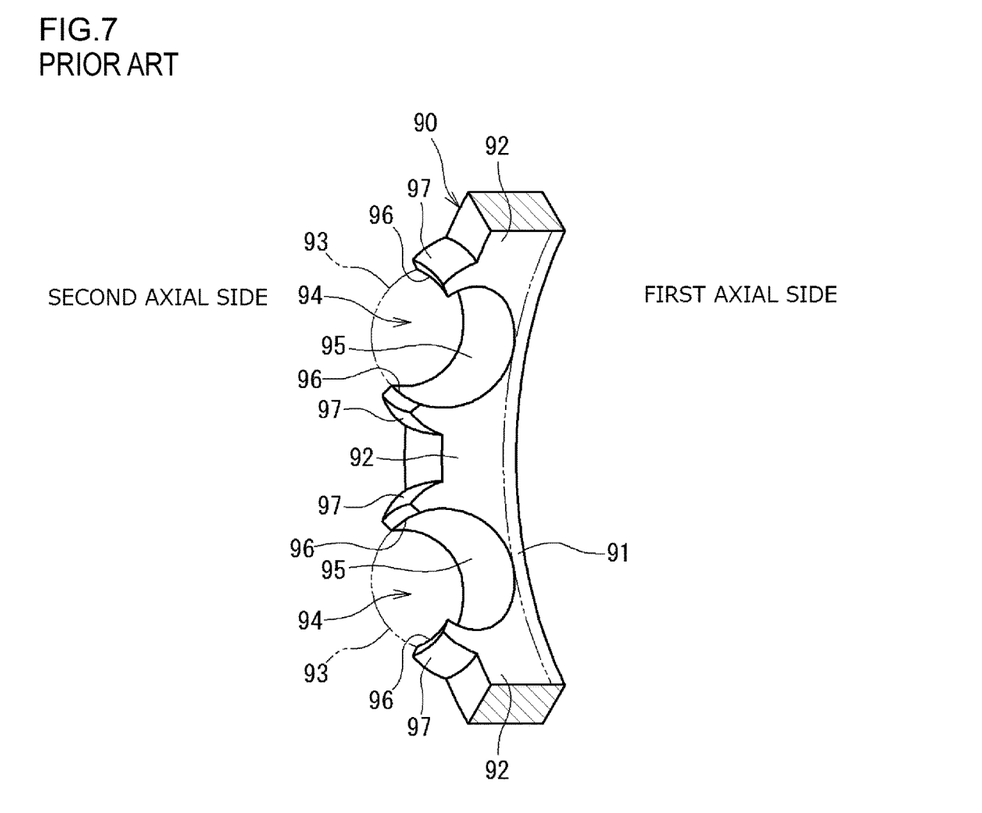
FIG. 7 is a perspective view of the cage of the conventional ball bearing.

As illustrated in FIG. 7, a resin cage has an annular portion 91 located on a first axial side with respect to balls 93 and a plurality of cage bars 92 extending from the annular portion 91 toward a second axial side. A space located on the second axial side of the annular portion 91 and defined between two cage bars 92 adjacent to each other in the circumferential direction serves as a pocket 94 that accommodates the ball 93.

The conventional ball bearing adopts a structure in which a cage 90 is guided by the balls 93 and that is referred to as a rolling element guide. In other words, the cage 90 is positioned by the balls 93. The same structure is adopted in the steel cage. In the cage 90 illustrated in FIG. 7, each of the pockets 94 has a pocket surface 95 shaped along a virtual spherical surface with a diameter slightly larger than the diameter of the balls 93 in order to achieve the rolling element guide structure.

The balls 93 need to be held by the cage 90 to adopt the rolling element guide structure. Thus, as described above, the pocket surface 95 has a shape along a virtual spherical surface with a diameter slightly larger than the diameter of the balls 93. Therefore, the pocket surface 95 facing the ball 93 is wider compared to the surface of the ball 93. A fine clearance is formed between the entire area of the pocket surface 95 and the surface of the ball 93. The entire area of the pocket surface 95 can be brought into contact with the ball 93 and thus positions the cage 90.

When the ball bearing having such rolling element guide structure rotates, grease (lubricant) is sheared in the fine clearance. When grease is sheared in a wide range between the pocket surface 95 and the ball 93, the resistance (shear resistance) caused by the shearing increases. When the ball bearing rotates, the balls 93 rotate (revolve) around the inner ring along with the cage 90 while rotating (turning) about their rotational center axes at high speed. This causes a significant difference in a rotational speed (sliding speed) between the balls 93 and the cage 90, resulting in significantly high shearing speed of grease. As described above, in the conventional ball bearings, shearing of grease generates rotational resistance (running torque). Further, shearing reduces the service life of grease.

SUMMARY OF THE INVENTION

One object of the invention is to suppress shearing of lubricant provided in an annular space formed between an inner ring and an outer ring, thereby reducing rotational resistance and achieving longer service life of the lubricant.

An aspect of the present invention provides a ball bearing that includes an inner ring, an outer ring, a plurality of balls, and an annular cage. The inner ring has an inner raceway groove on an outer peripheral surface of the inner ring. The outer ring has an outer raceway groove on an inner peripheral surface of the outer ring. The balls are interposed between the inner raceway groove and the outer raceway groove. The cage holds the balls. The cage includes an annular portion located on a first axial side with respect to the balls, the first axial side being one side in an axial direction of the ball bearing and a plurality of cage bars extending from the annular portion toward a second axial side, the second axial side being the other side in the axial direction of the ball bearing. A space located on a second axial side of the annular portion and defined between any two of the cage bars adjacent to each other in a circumferential direction serves as a pocket that accommodates the corresponding one of the balls. The pocket has a contact surface that is brought into point contact with the ball at an intersection point between a rotational center axis of the ball and a surface of the ball when the cage is displaced toward the second axial side.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
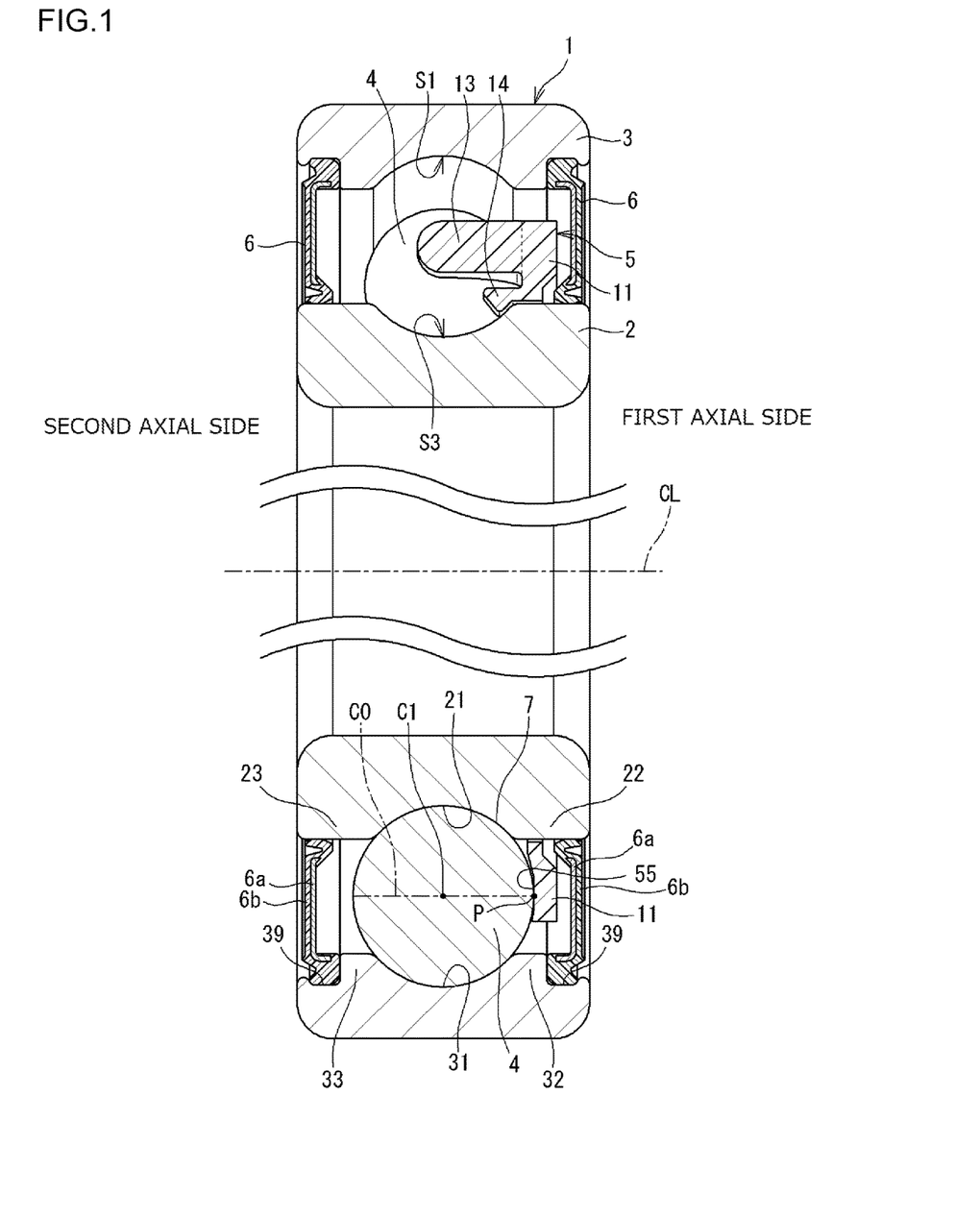
FIG. 1 is a sectional view of a ball bearing according to an embodiment of the present invention.

Hereinafter, example embodiments of the invention will be described with reference to the accompanying drawings. FIG. 1 is a sectional view of a ball bearing according to an embodiment of the present invention. A ball bearing 1 includes an inner ring 2, an outer ring 3, a plurality of balls 4, and an annular cage 5. The outer ring 3 is disposed radially outward of the inner ring 2. The balls 4 are interposed between the inner ring 2 and the outer ring 3. The annular cage 5 holds the balls 4. In the ball bearing 1, grease is provided as lubricant in an annular space formed between the inner ring 2 and the outer ring 3. In the present embodiment, an axial direction includes a direction parallel to a center line CL of the ball bearing 1 (hereinafter referred to as "bearing center line CL"), and a radial direction corresponds to a direction perpendicular to the bearing center line CL.

The ball bearing 1 illustrated in FIG. 1 further includes a sealing device 6 on each end in the axial direction. The sealing device 6 prevents grease provided inside of the bearing (the annular space) where the balls 4 and the cage 5 are disposed from leaking outside. The sealing device 6 also prevents entry of foreign matter into the bearing.

The inner ring 2 is an annular member, and an inner raceway groove 21 is formed in an outer peripheral surface thereof along which the balls 4 roll. In a longitudinal sectional view illustrated in FIG. 1, the inner raceway groove 21 has a concaved arc shape with a radius slightly larger than the radius of the balls 4. The inner ring 2 has a first shoulder 22 on a first axial side of the inner raceway groove 21 and a second shoulder 23 on a second axial side of the inner raceway groove 21.

The outer ring 3 is an annular member, and an outer raceway groove 31 is formed in an inner peripheral surface thereof along which the balls 4 roll. In a longitudinal sectional view illustrated in FIG. 1, the outer raceway groove 31 has a concaved arc shape with a radius slightly larger than the radius of the balls 4. The outer ring 3 has a first shoulder 32 on the first axial side of the outer raceway groove 31 and a second shoulder 33 on the second axial side of the outer raceway groove 31. A groove 39 is formed in the inner peripheral surface of the outer ring 3 at each end in the axial direction. The sealing device 6 is attached to the groove 39. The ball bearing 1 in the present embodiment is a deep groove ball bearing.

The balls 4 are interposed between the inner raceway groove 21 and the outer raceway groove 31. Rotation of the ball bearing 1 (inner ring 2) brings the balls 4 into rolling contact with the inner raceway groove 21 and the outer raceway groove 31. That is, the balls 4 rotate (revolve) around the bearing center line CL along the inner raceway groove 21 and the outer raceway groove 31 while rotating (turning) around their respective rotational center axes CO. In the present embodiment, the rotational center axis CO of each ball 4 is a linear axis that is parallel to the bearing center line CL and that passes through a center C1 of the ball 4 (hereinafter referred to as "ball center C1"). At the intersection point P of the rotational center axis CO of the ball 4 and the surface 7 of the ball 4, the peripheral velocity caused by the rotation of the ball 4 is zero. The ball 4 is brought into contact with the inner raceway groove 21 at the deepest point (area S3) thereof and with the outer raceway groove 31 at the deepest point (area S1) thereof. Each ball 4 is a steel member made of, for example, bearing steel. The inner ring 2 and the outer ring 3 are steel members made of, for example, bearing steel or steel for machine structural use.

Figure 2:
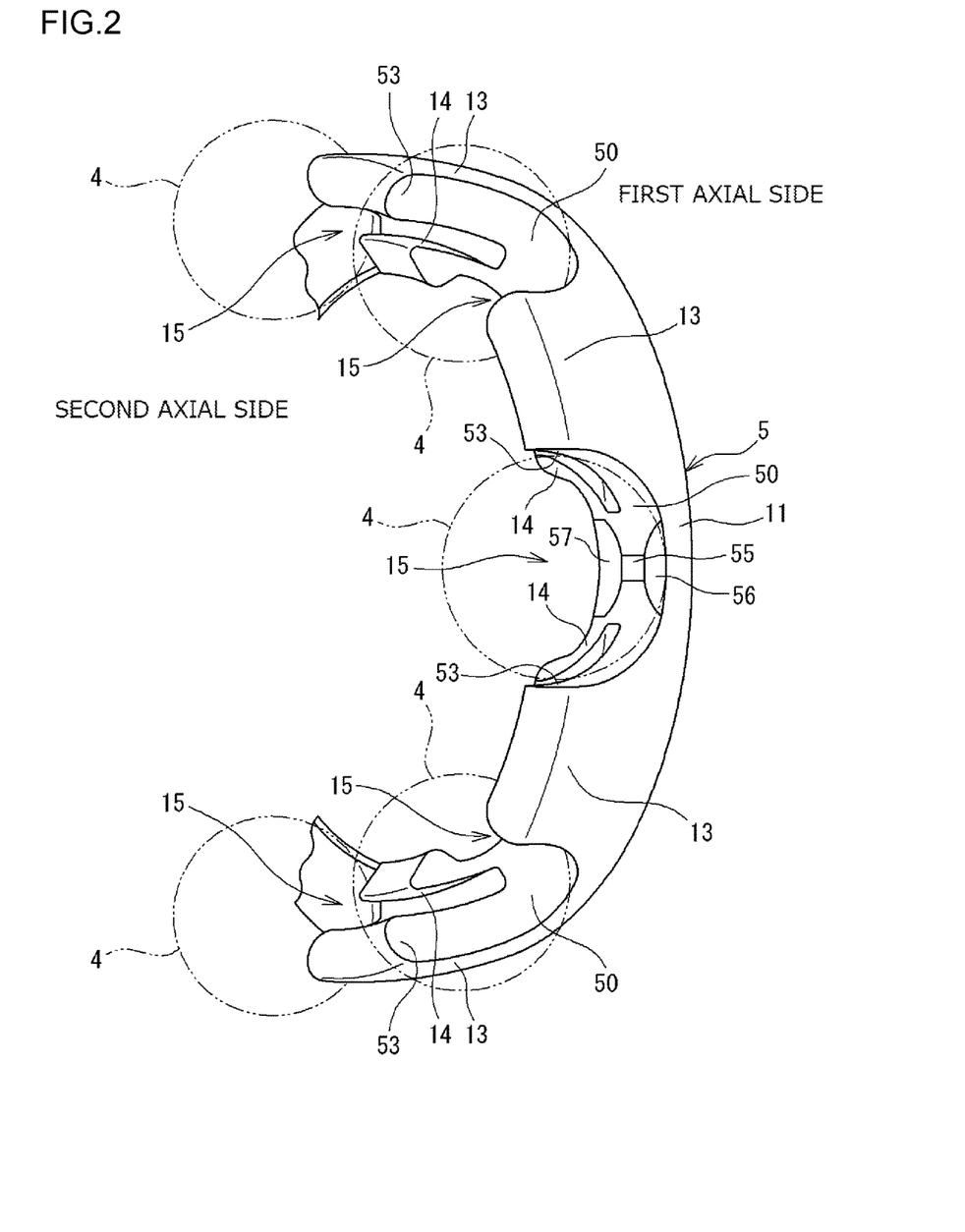
FIG. 2 is a perspective view of a part of a cage.

FIG. 2 is a perspective view illustrating a part of the cage 5. As illustrated in FIGS. 1 and 2, the cage 5 has an annular portion 11 located on the first axial side with respect to the balls 4 and a plurality of cage bars 13 extending from the annular portion 11 toward the second axial side. The cage 5 is a so-called snap cage. The cage 5 in the present embodiment has guide portions 14. A space located on the second axial side of the annular portion 11 and defined between two cage bars 13 adjacent to each other in the circumferential direction serves as a pocket 15 that accommodates the ball 4. The pockets 15 are open on the second axial side. The pockets 15 are arranged in a circumferential direction. The cage 5 can hold the balls 4 at intervals in the circumferential direction.

Figure 3:
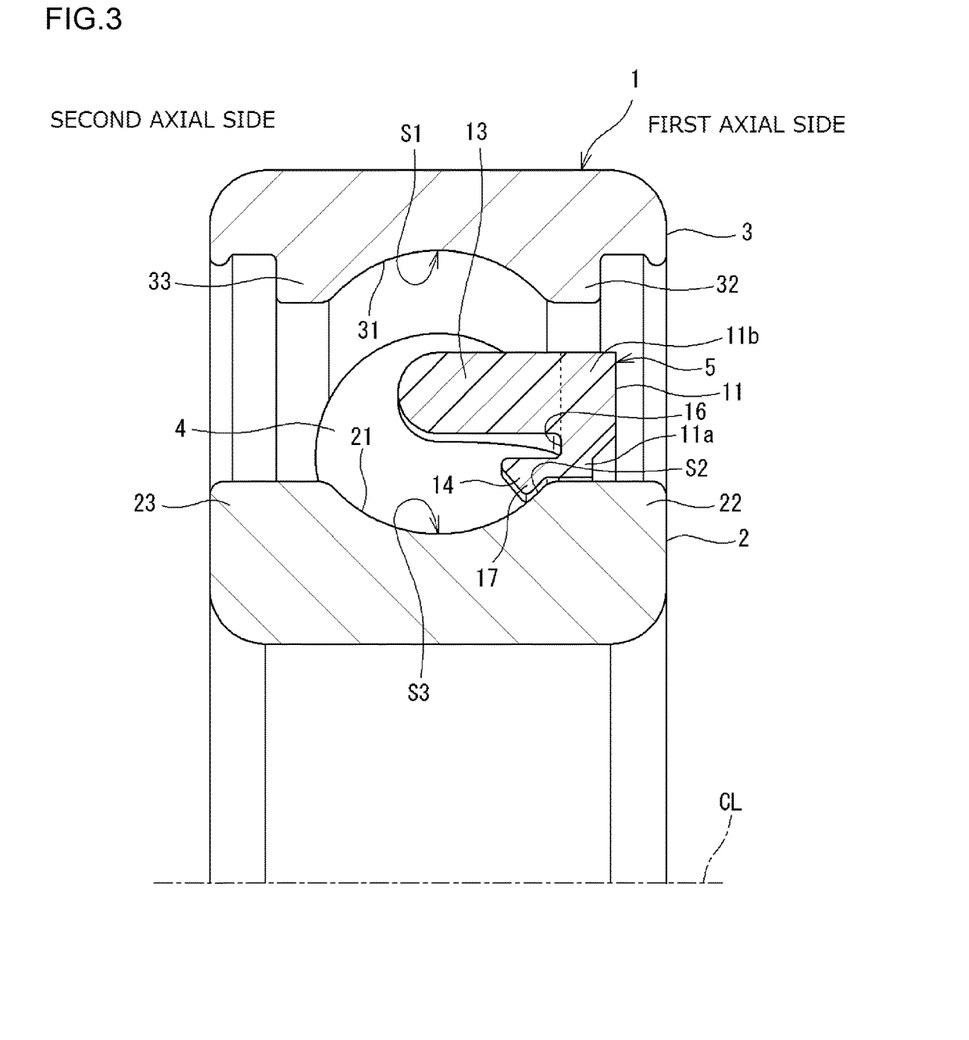
FIG. 3 is a sectional view of an inner ring, an outer ring, and the cage.

FIG. 3 is a sectional view of the inner ring 2, the outer ring 3, and the cage 5. In FIG. 3, the sealing device 6 is removed. The annular portion 11 is located between the shoulder 22 of the inner ring 2 (see FIG. 1) and the shoulder 32 of the outer ring 3. The cage bar 13 extends linearly from a radially outer side portion 11b of the annular portion 11 toward the second axial side. The guide portion 14 extends from a radially inner side portion 11a of the annular portion 11 toward the second axial side. Although not illustrated, the guide portion 14 may be configured so as to separate from a portion (base portion) of the cage bar 13 on the first axial side and project radially inward. The guide portion 14 is disposed radially inward of the cage bar 13 and a cutout 16 is formed between the guide portion 14 and the cage bar 13. The cutout 16 is formed by cutting out a part of the cage bar 13 in a recessed shape viewed in section. All cage bars 13 have the same shape and all guide portions 14 have the same shape. The cage 5 is made of resin (synthetic resin) and formed by injection molding. The annular portion 11, the cage bars 13, and the guide portions 14 are integrally formed, and the cage 5 is a single piece.

Figure 4:
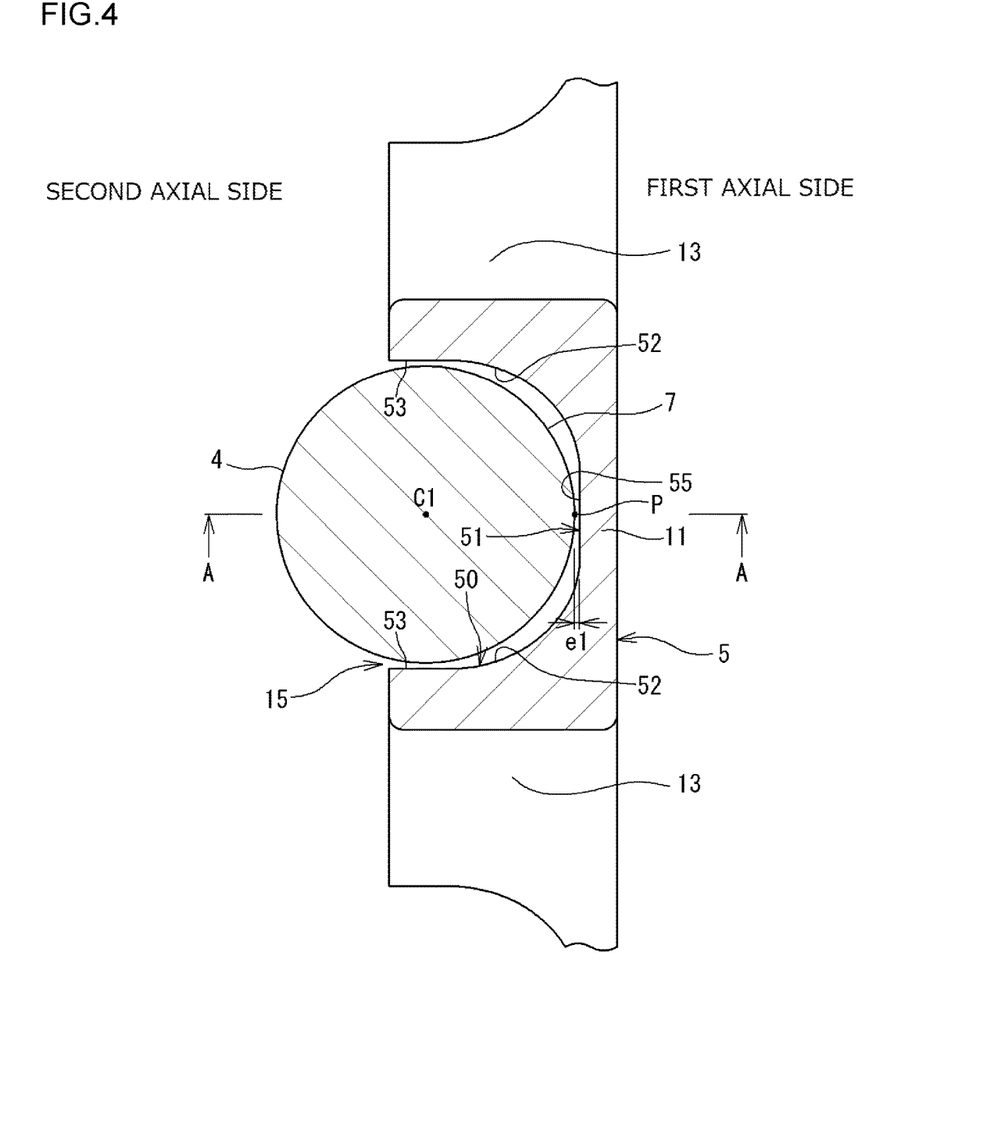
FIG. 4 is a (partially sectional) view as viewed from an outer peripheral side of balls and the cage.

FIG. 4 is a view from an outer peripheral side of the ball 4 and the cage 5. FIG. 4 partially shows a section taken along a plane that passes through the ball center C1 and that is perpendicular to the virtual line extending in the radial direction of the ball bearing 1. The pocket 15 has a pocket surface 50 that faces the surface (outer peripheral surface) 7 of the ball 4. As illustrated in FIG. 4, when the center of the pocket 15 and the ball center C1 coincide with each other (hereinafter referred to as "neutral state"), a clearance is formed between the entire pocket surface 50 and the ball 4, which are not in contact with each other. Thus, the cage 5 can be displaced, with respect to the ball 4, from the neutral state toward the first axial side and the second axial side, and also (slightly) in a first circumferential direction and a second circumferential direction. The center of the pocket 15 is a point on a circumference having the same diameter as that of the pitch circle of the ball 4. The cage 5 having such pocket 15 with the center described above can be displaced by the same amount with respect to the ball 4 toward the first axial side and the second axial side, and can be displaced by the same amount with respect to the ball 4 in the first circumferential direction and the second circumferential direction. As illustrated in FIG. 3, the cage 5 is placed coaxially with the inner ring 2 and the outer ring 3 around the bearing center line CL in the neutral state.

As illustrated in FIG. 3, the guide portion 14 of the cage 5 can be brought into contact with the inner raceway groove 21. The guide portion 14 brought into contact with a part of the inner raceway groove 21 restricts displacement of the cage 5 in the radial direction (toward the inside and outside in the radial direction) and further restricts displacement of the cage 5 toward the first axial side. A part of the annular portion 11 (contact surface 55 described below) brought into contact with the ball 4 restricts displacement of the cage 5 toward the second axial side.

As illustrated in FIG. 1, each sealing device 6 has a core metal 6a and a rubber sealing portion 6b fixed to the core metal 6a. The outer peripheral portion (radially outside portion) of the sealing portion 6b is fitted to the groove 39 of the outer ring 3 to attach the sealing device 6 to the outer ring 3. A lip formed in the inner circumference (radially inside portion) of the sealing portion 6b is in contact with the outer peripheral surface of the shoulder 22 (23) of the inner ring 2. The sealing device 6 may have a different structure. For example, although not illustrated, the sealing device 6 may be configured only by an annular member and may constitute a labyrinth seal between the inner ring 2 and the annular member.

Figure 5:
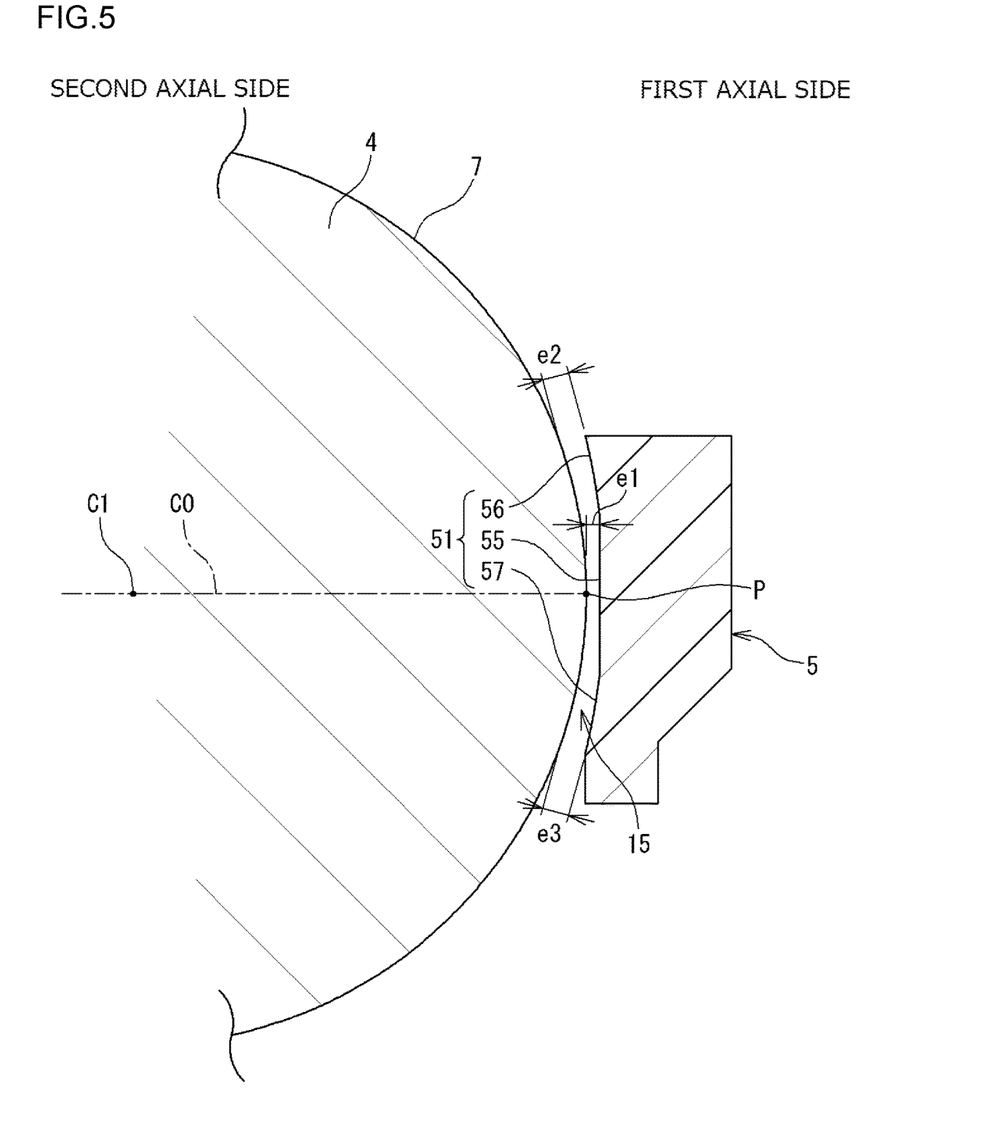
FIG. 5 is a sectional view as viewed in the direction of arrow A in FIG. 4.

As illustrated in FIG. 4, the pocket surface 50 of the pocket 15 of the cage 5 has a side surface 51, arc surfaces 52, and flat surfaces 53. The side surface 51 is located on the second axial side of the annular portion 11. The arc surfaces 52 extend from the side surface 51 in the opposite directions along the circumferential direction. The flat surfaces 53 each extend from the corresponding one of the arc surfaces 52. The arc surfaces 52 and the flat surfaces 53 define the surfaces of the cage bar 13 in the circumferential direction. FIG. 5 is a sectional view taken along the line A-A in FIG. 4, and illustrating a section along a plane including the ball center C1 and the bearing center line CL (see FIG. 1). As illustrated in FIG. 5, the side surface 51 has a contact surface 55, a radially outward facing surface 56, and a radially inward facing surface 57. The contact surface 55 is located in the center in the radial direction. The radially outward facing surface 56 (hereinafter referred to as "outer facing surface 56") extends from the contact surface 55 in the radially outward direction. The radially inward facing surface 57 (hereinafter referred to as "inner facing surface 57") extends from the contact surface 55 in the radially inward direction.

The contact surface 55 is a planar rectangular surface and is brought into point contact with the ball 4 when the cage 5 is displaced toward the second axial side from the neutral state. The contact surface 55 is brought into contact with the ball 4 at the intersection point P between the rotational center axis CO of the ball 4 and the surface 7 of the ball 4. Thus, the contact surface 55 brought into contact with the ball 4 restricts displacement of the cage 5 toward the second axial side. In the neutral state, a fine clearance e1 is formed between the intersection point P and the contact surface 55.

The outer facing surface 56 extends from an upper end of the contact surface 55 in the radially outer direction. The outer facing surface 56 extends along a sphere with a radius larger than the radius of the ball 4 and faces the surface 7 of the ball 4. The inner facing surface 57 extends from a lower end of the contact surface 55 in the radially inner direction. The inner facing surface 57 extends along a sphere with a radius larger than the radius of the ball 4 and faces the surface 7 of the ball 4. As described above, the contact surface 55 is provided as the center of the pocket 15 in the rear side surface (the side surface 51). Further, the pocket 15 has the outer facing surface 56 disposed on a radially outward side of the contact surface 55 and facing the ball 4 and the inner facing surface 57 disposed on a radially inward side of the contact surface 55 and facing the ball 4.

In the neutral state, a clearance e2 is formed between the outer facing surface 56 and the surface 7 of the ball 4, and a clearance e3 is formed between the inner facing surface 57 and the surface 7 of the ball 4. Both clearances e2 and e3 are larger than the clearance e1 formed between the surface 7 (intersection point P) of the ball 4 and the contact surface 55. The clearances e2 and e3 do not have to be constant. However, the minimum dimensions of the clearances e2 and e3 are larger than the clearance e1. Dimensions of the clearances e2 and e3 are preferably set to a value two times or more and four times or less of the clearance e1. The clearances e2 and e3 have wide dimensions such that grease is less likely to be sheared.

The outer facing surface 56 and the inner facing surface 57 project toward the second axial side with respect to the contact surface 55 and are close to the ball 4. However, the outer facing surface 56 and the inner facing surface 57 are not in contact with the ball 4 in the normal rotating state. That is, even if the cage 5 is displaced toward the second axial side from the neutral state, neither the outer facing surface 56 nor the inner facing surface 57 is brought into contact with the ball 4. The cage 5 can be displaced in the radial direction only by a small amount since the guide portion 14 restricts displacement of the cage 5. In the normal rotating state, even if the cage 5 is displaced toward the second axial side assisted by a component in the radial direction from the neutral state, neither the outer facing surface 56 nor the inner facing surface 57 is brought into contact with the ball 4.

As illustrated in FIG. 4, the pocket 15 is open on the second axial side and has a pair of the flat surfaces 53 in the opened area on the second axial side. The flat surfaces 53 are provided facing each other in the circumferential direction with an interval slightly larger than the diameter of the ball 4. The flat surfaces 53 have planar shapes and are arranged in parallel to each other. When the cage 5 and the ball 4 relatively approach each other in the circumferential direction from the neutral state, a part of the pocket surface 50 and the surface 7 of the ball 4 are brought into contact with each other. The ball 4 is brought into contact with a point on the flat surface 53 (contact point) of the pocket surface 50. The arc surfaces 52 are interposed between the side surface 51 and the flat surfaces 53 and are not brought into contact with the ball 4. Of all the clearances formed between the pocket 15 and the ball 4 in the neutral state, the clearance e1 formed between the contact surface 55 and the ball 4 is the smallest.

Referring to FIG. 3, the guide portion 14 of the cage 5 is further described. The guide portion 14 has a projection 17 that projects radially inward toward the inner raceway groove 21. A diameter (inner diameter) of the inner peripheral end of the projection 17 is smaller than the diameter (outer diameter) of the shoulder 22 of the inner ring 2. Thus, the guide portion 14 is elastically deformed when the cage 5 is attached to the balls 4 interposed between the inner ring 2 and the outer ring 3.

The guide portion 14 is provided to position the cage 5. When the inner ring 2 and the cage 5 are coaxially arranged (in the neutral state), the projections 17 of the guide portions 14 each face the inner raceway groove 21 with a clearance. When the cage 5 is displaced in the radial direction, some of the projections 17 are brought into contact with the inner raceway groove 21 in the radial direction. This enables the guide portions 14 to position the cage 5 in the radial direction. Furthermore, when the cage 5 is displaced toward the first axial side from the neutral state, the guide portions 14 are brought into contact with the inner raceway groove 21 in the axial direction, thereby enabling the guide portions 14 to position the cage 5 in the axial direction. Thus, the guide portions 14 brought into contact with the inner raceway groove 21 restrict the displacement of the cage 5 toward the first axial side.

In the present embodiment, each guide portion 14 is brought into contact with the inner raceway groove 21 in the non-contact area S2 other than the area S3 (hereinafter referred to as "contact area S3") where the ball 4 is brought into contact with the inner raceway groove 21. Further, the guide portion 14 is brought into contact with the inner raceway groove 21 at one point on the non-contact area S2. The guide portion 14 and the inner ring 2 are brought into line contact or point contact with each other. The non-contact area S2 is provided at a position closer to the shoulder 22 with respect to the contact area S3. The ball 4 is in contact with the contact area S3 when an axial load is not applied to the entire bearing. The ball 4 is not in contact with the non-contact area S2 when the axial load is not applied to the entire bearing. When the axial load is not applied to the entire bearing, the center of the outer raceway groove 31 in the axial direction, the center of the inner raceway groove 21 in the axial direction, and the centers of the balls 4 are aligned in a plane perpendicular to the bearing center line CL.

As described above, in the ball bearing 1 in the present embodiment, the pocket 15 (see FIG. 5) of the cage 5 has the contact surface 55. When the cage 5 is displaced toward the second axial side, the contact surface 55 is brought into point contact with the ball 4 at the intersection point P between the rotational center axis CO of the ball 4 and the surface 7 of the ball 4. That is, the pocket surface 50 of the pocket 15 includes the planar-shaped contact surface 55 that is brought into point contact with the ball 4. The intersection point P between the rotational center axis CO of the ball 4 and the surface 7 of the ball 4 is the contact point with the cage 5. In the ball bearing 1, when the cage 5 holding the ball 4 between the inner ring 2 and the outer ring 3 is displaced toward the second axial side, the ball 4 and the cage 5 are brought into point contact with each other at a position where the peripheral velocity therebetween becomes zero, thereby positioning the cage 5. Thus, the cage 5 is positioned at an area where the shearing speed of grease between the cage 5 and the ball 4 is small. This can suppress the shearing of grease between the ball 4 and the cage 5. Reduction in rotational resistance of the ball bearing 1 and longer service life of grease can thus be achieved. In the conventional ball bearing (see FIG. 7), grease is sheared in a wide range between the pocket surfaces 95 and the balls 93, and the balls 93 rotate (turn) relative to the pocket surfaces 95 at high rotational speed. This causes the grease to be sheared with a significant speed difference (significant shearing speed). Thus, with the conventional ball bearing (see FIG. 7), there is a possibility that increased rotational resistance shears the grease significantly, thereby reducing the service life of the grease.

As illustrated in FIG. 3, rotation of the ball bearing 1 (inner ring 2) causes the balls 4 to rotate while revolving along the inner raceway groove 21 and the outer raceway groove 31. Therefore, the rotational speed difference between the cage 5 and the inner ring 2 (outer ring 3) is smaller than the rotational speed difference between the cage 5 and the balls 4. Since the rotational speed differences correspond to the shearing speed, grease is less likely to be sheared with smaller rotational speed difference. Thus, in the present embodiment as described above, when the cage 5 is displaced toward the first axial side, the cage 5 is brought into contact with the inner ring 2 (inner raceway groove 21) at the guide portions 14 instead of with the balls 4, thereby positioning the cage 5. That is, in order to position the cage 5 that is displaced toward the first axial side, the cage 5 and the inner ring 2 are brought into contact with each other, since the rotational speed difference is small therebetween. In the present embodiment, grease is sheared due to the speed difference between the rotational speed of the inner ring 2 and the rotational speed of the cage 5. This rotational speed difference is by far smaller (than the rotational speed difference between the rotational speed of the balls 4 and the rotational speed of the cage 5), which suppresses shearing of grease. The guide portion 14 and the inner ring 2 are brought into line contact or point contact with each other. The small contact range can further suppress shearing of grease. This contributes to reducing rotational resistance and achieving longer service life of grease.

As described above, of all the clearances formed between the pocket 15 and the ball 4 in the neutral state (see FIG. 4), the clearance e1 formed between the contact surface 55 and the ball 4 is the smallest. In the neutral state, the smallest dimension between the pocket surface 50 and the ball 4 is the dimension between the contact surface 55 and the ball 4. Thus, of the clearances formed between the pocket 15 and the ball 4, grease is less likely to be sheared in the area other than the clearance between the contact surface 55 and the ball 4. This further contributes to reducing rotational resistance and achieving longer service life of grease.

Even if the cage 5 in the present embodiment is excessively deformed for some reason, the deformation causes a part of the cage 5 to be brought into contact (touched down) with the ball 4 or the inner ring 2 (or the outer ring 3) (at the contact surface 55 and at other portions). This configuration allows obstruction of the excessive deformation. Excessive deformation of the cage 5 may break the cage 5. In order to obstruct such deformation, in the present embodiment (see FIG. 5), the pocket 15 has the inner facing surface 57 facing the ball 4 as described above. In the neutral state, the large clearance e3 is formed between the inner facing surface 57 and the ball 4. The clearance e3 is larger than the clearance e1 formed between the ball 4 and the contact surface 55 in the neutral state. When the cage 5 is about to be excessively deformed, this configuration obstructs the deformation by bringing the inner facing surface 57 and the ball 4 into contact with each other, thereby preventing the cage 5 from breaking. During normal rotation (when excessive deformation is not generated), the large clearance e3 formed between the ball 4 and the inner facing surface 57 prevents grease from being sheared, thereby making grease less likely to be sheared. When the cage 5 is about to be excessively deformed, the outer facing surface 56 can be brought into contact with the ball 4 depending on the deformation mode. This allows obstruction of excessive deformation.

In the present embodiment, the guide portion 14 is brought into contact with a part of the inner ring 2 (inner raceway groove 21). Thus, the entire cage 5 is easily disposed at a position closer to the inner ring 2, thereby enabling reduction in resistance generated by grease sheared by the cage 5. That is, when the ball bearing 1 rotates, grease in the annular space between the inner ring 2 and the outer ring 3 is likely to be gathered at a position closer to the outer ring 3 by a centrifugal force. Therefore, providing the cage 5 at a position closer to the inner ring 2 makes the cage 5 less likely to shear grease. This enables reduction in resistance caused by shearing of grease.

Figure 6:
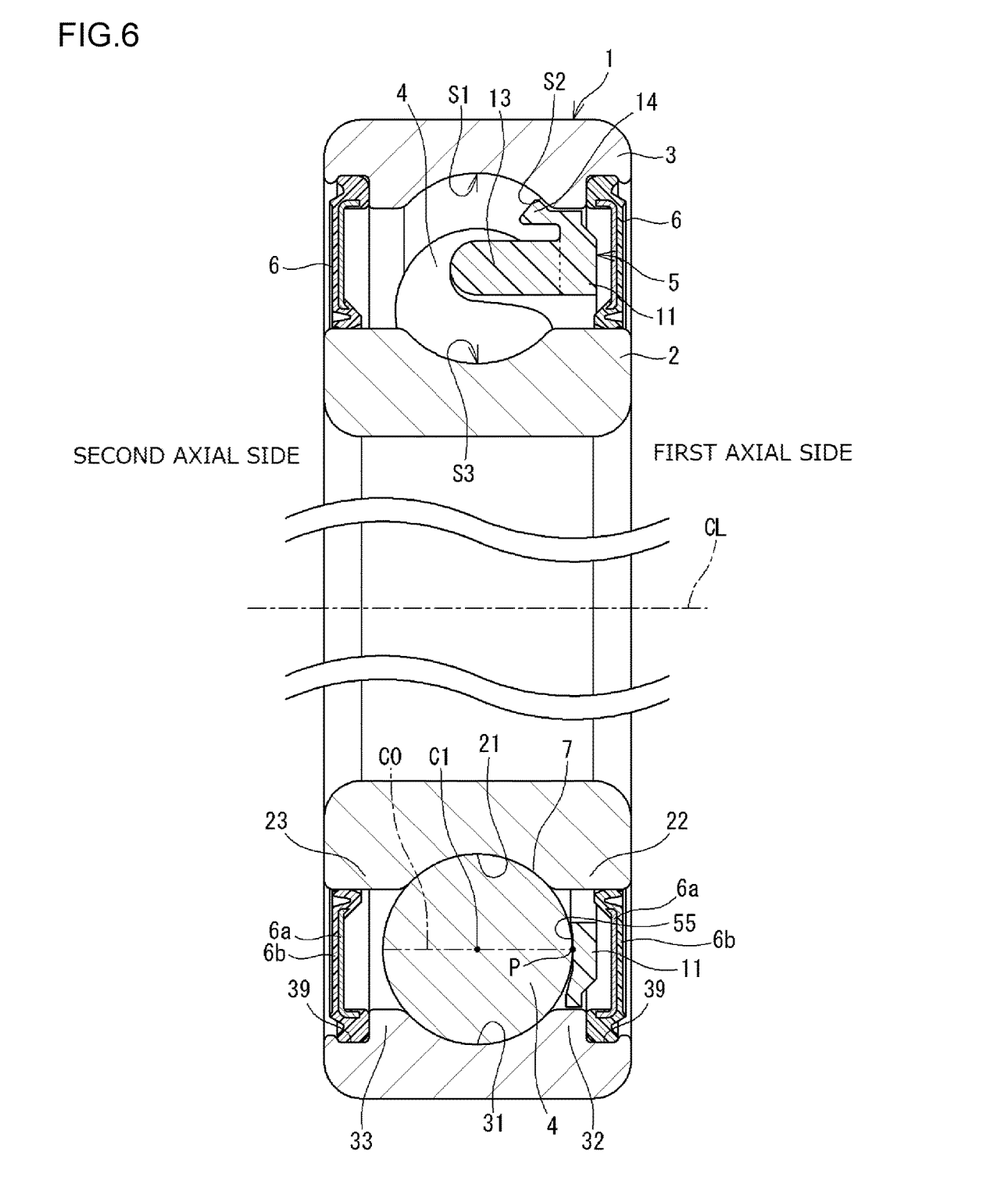
FIG. 6 is a sectional view of a part of another ball bearing.

In the above-described embodiment (see FIG. 3 for example), the guide portion 14 of the cage 5 is brought into contact with the inner ring 2 (inner raceway groove 21). However, as illustrated in FIG. 6, the guide portion 14 of the cage 5 may be brought into contact with the outer ring 3 (outer raceway groove 31). In this case, the guide portion 14 may be provided at a position closer to the outer ring 3 with respect to the cage bar 13. The guide portion 14 is brought into contact with the outer raceway groove 31 in the non-contact area S2 other than the area S1 where the ball 4 is brought into contact with the outer raceway groove 31. This configuration is preferably used to position the cage 5.

As described above according to the embodiments, the cage 5 has a guide portion 14. When the cage 5 is displaced toward the first axial side from the neutral state, the guide portion 14 is brought into contact with the inner ring 2 (inner raceway groove 21) (as illustrated in FIG. 3) or with the outer ring 3 (outer raceway groove 31) (as illustrated in FIG. 6), thereby positioning the cage 5. As illustrated in FIG. 6, even in the case where the guide portion 14 is brought into contact with the outer ring 3 (outer raceway groove 31), the pocket of the cage 5 has a contact surface 55 that is brought into point contact with the ball 4 when the cage 5 is displaced toward the second axial side. The contact surface 55 is brought into point contact with the ball 4 at the intersection point P between the rotational center axis CO of the ball 4 and the surface 7 of the ball 4, thereby positioning the cage 5. Thus, the cage 5 is positioned in an area with a smaller shearing speed of grease between the cage 5 and the ball 4. As a result, shearing of grease between the ball 4 and the cage 5 can be supressed, thereby achieving reduction in rotational resistance of the ball bearing 1 and longer service life of grease.

The embodiments described above are to be considered as illustrative and not restrictive in all respects. That is, the ball bearing according to the invention is not limited to the configurations or structures illustrated in the drawings but may have any other configuration or structure within the scope of the invention. In the above-described embodiment, the case has been described where the ball bearing is a deep groove ball bearing. However, the ball bearing may be an angular contact ball bearing. In the case of the angular contact ball bearing, a rotational center axis of each ball is inclined. A cage may be configured such that a contact surface of each pocket surface of the cage is brought into point contact with the ball at an intersection point between the inclined rotational center axis and a surface of the ball.

According to the invention, shearing of lubricant between the ball and the cage can be supressed, thereby achieving reduction in rotational resistance of the ball bearing and longer service life of the lubricant.

What is claimed is:

1. A ball bearing comprising:
   an inner ring that has an inner raceway groove on an outer peripheral surface of the inner ring;
   an outer ring that has an outer raceway groove on an inner peripheral surface of the outer ring;
   a plurality of balls interposed between the inner raceway groove and the outer raceway groove; and
   an annular cage that holds the balls, wherein:
   the cage includes:
      an annular portion located on a first axial side with respect to the balls, the first axial side being one side in an axial direction of the ball bearing, and
      a plurality of cage bars extending from the annular portion toward a second axial side, the second axial side being the other side in the axial direction of the ball bearing;
   a space located on the second axial side of the annular portion and defined between any two of the cage bars adjacent to each other in a circumferential direction serves as a pocket that accommodates a corresponding one of the balls;
   the pocket has a contact surface that is brought into point contact with the ball at an intersection point between a rotational center axis of the ball and a surface of the ball when the cage is displaced toward the second axial side; and
   the pocket has facing surfaces with the contact surface interposed inbetween as a center, one of the facing surfaces disposed on a radially outward side of the contact surface and facing the ball, and the other of the facing surfaces disposed on a radially inward side of the contact surface and facing the ball, the facing surfaces being continuous with the contact surface and non-parallel with respect to the contact surface, each facing surface having a length, along a circumferential direction of the cage, that is greater than a length of the contact surface along the circumferential direction.

2. The ball bearing according to claim 1, wherein the cage has a guide portion that is brought into contact with either of the inner ring or the outer ring when the cage is displaced toward the first axial side.

3. The ball bearing according to claim 2, wherein in a neutral state in which a center of the pocket and a center of the ball coincide with each other, a clearance formed between the ball and the facing surface on the radially outward side of the contact surface and a clearance formed between the ball and the facing surface on the radially inward side of the contact surface are larger than a clearance formed between the ball and the contact surface in the neutral state.

4. The ball bearing according to claim 3, wherein in the neutral state in which the center of the pocket and the center of the ball coincide with each other, of all clearances formed between the pocket and the ball, the clearance formed between the contact surface and the ball is the smallest.

5. The ball bearing according to claim 2, wherein in a neutral state in which a center of the pocket and a center of the ball coincide with each other, of all clearances formed between the pocket and the ball, the clearance formed between the contact surface and the ball is the smallest.

6. The ball bearing according to claim 1, wherein in a neutral state in which a center of the pocket and a center of the ball coincide with each other, a clearance formed between the ball and the facing surface on the radially outward side of the contact surface and a clearance formed between the ball and the facing surface on the radially inward side of the contact surface are larger than a clearance formed between the ball and the contact surface in the neutral state.

7. The ball bearing according to claim 6, wherein in the neutral state in which the center of the pocket and the center of the ball coincide with each other, of all clearances formed between the pocket and the ball, the clearance formed between the contact surface and the ball is the smallest.

8. The ball bearing according to claim 1, wherein in a neutral state in which a center of the pocket and a center of the ball coincide with each other, of all clearances formed between the pocket and the ball, the clearance formed between the contact surface and the ball is the smallest.

9. The ball bearing according to claim 1, wherein each facing surface is a spherical surface.

* * * * *